United States Patent
Cook

[19]

[11] Patent Number: 6,164,948
[45] Date of Patent: Dec. 26, 2000

[54] EXTRUSION DIE SYSTEM WITH REMOVABLE INSERT

[75] Inventor: Michael Charles Cook, Marietta, Ga.

[73] Assignee: Kimberly-Clark Worldwide, Inc., Neenah, Wis.

[21] Appl. No.: 09/075,510

[22] Filed: May 8, 1998

[51] Int. Cl.[7] .................................................. B29C 47/08
[52] U.S. Cl. ...................... 425/186; 425/190; 425/215; 425/376.1
[58] Field of Search .................... 425/190, 186, 425/192 R, 215, 376.1, 133.5

[56] References Cited

U.S. PATENT DOCUMENTS

| | | | |
|---|---|---|---|
| 1,906,744 | 5/1933 | Frandsen | 425/190 |
| 3,338,992 | 8/1967 | Kinney . | |
| 3,341,394 | 9/1967 | Kinney . | |
| 3,502,538 | 3/1970 | Petersen . | |
| 3,502,763 | 3/1970 | Hartmann . | |
| 3,542,615 | 11/1970 | Dobo et al. . | |
| 3,692,618 | 9/1972 | Dorschner et al. . | |
| 3,802,817 | 4/1974 | Matsuki et al. | 425/66 |
| 3,849,241 | 11/1974 | Butin et al. . | |
| 4,038,005 | 7/1977 | Lenk | 425/190 |
| 4,248,579 | 2/1981 | Maejima | 425/227 |
| 4,340,563 | 7/1982 | Appel et al. | 264/518 |
| 4,347,050 | 8/1982 | Figuereo | 425/190 |
| 4,413,973 | 11/1983 | Peters | 425/461 |
| 4,564,350 | 1/1986 | Holmes et al. . | |
| 4,652,410 | 3/1987 | Inoue et al. | 425/190 |
| 4,708,618 | 11/1987 | Reifenhasuer et al. | 425/133.5 |
| 4,781,564 | 11/1988 | Cerrone . | |
| 4,799,874 | 1/1989 | Bellmer et al. | 425/131.1 |
| 4,820,142 | 4/1989 | Balk | 425/66 |
| 4,892,473 | 1/1990 | Elia et al. | 425/197 |
| 5,061,166 | 10/1991 | Gohlisch et al. | 425/133.5 |
| 5,242,290 | 9/1993 | Hiraiwa et al. | 425/131.1 |
| 5,248,247 | 9/1993 | Rübhausen et al. | 425/66 |
| 5,332,380 | 7/1994 | Unland | 425/135 |
| 5,435,708 | 7/1995 | Kaun | 425/72.2 |
| 5,580,581 | 12/1996 | Buehning | 425/7 |
| 5,720,986 | 2/1998 | Gohlisch et al. | 425/131.1 |

Primary Examiner—Harold Pyon
Assistant Examiner—Joseph Leyson
Attorney, Agent, or Firm—Pauley Petersen Kinne & Fejer

[57] ABSTRACT

A die system for the extrusion of polymer permits external cleaning and maintenance without shutting down the operation. Removable die inserts are located on one or both sides of the die opening section through which polymer is extruded. The inserts are spaced from the die opening section, by a very small distance, so as to avoid interfering with the opening section. When molten polymer accumulates and burns in areas surrounding the die opening section, the inserts can be removed and replaced without interrupting the extrusion of polymer.

20 Claims, 2 Drawing Sheets

EXTRUSION DIE SYSTEM WITH REMOVABLE INSERT

FIELD OF THE INVENTION

The present invention is directed to a die system with a removable insert for use in the extrusion of polymers. The removable insert permits cleaning and maintenance of the die without shutting down the extrusion line.

BACKGROUND OF THE INVENTION

Various mechanisms are known to facilitate the cleaning and maintenance of dies used for the extrusion of polymer materials, while minimizing down time. Molten polymers are extruded through dies to form films, strands, nonwoven webs, and other finished polymer forms. As polymer exits the die, some of the polymer clings to the die openings or "lips," accumulating on the exterior surface of the die. This die lip build-up gradually increases until it accumulates to a point where it breaks off, possibly causing a defect in the product. Considerable engineering goes into the design of dies to minimize this build-up. Diverging, converging, radiused, and angled die lip geometries all are examples of methods developed to minimize this build-up. However, no die design completely eliminates it. It is common practice to temporarily halt the extrusion operation to perform maintenance on the die to remove this build-up.

U.S. Pat. No. 5,435,708, issued to Kaun, discloses a melt blowing die head with opposing die lips mounted on lip guides pivotally connected to respective setback bars. To facilitate cleaning and maintenance of the die, the lips can be swung away from the spinnerette on the respective lip guides. This allows for reduced down time during maintenance of the die, but does not permit maintenance during operation of the line.

U.S. Pat. No. 5,720,986, issued to Gohlisch et al., discloses an extrusion head having a stationary part fixed on an extrusion installation. The installation includes a plurality of extrusion cylinders. The stationary part has flow channels, each in communication with a respective extrusion cylinder and a common extrusion die. Two pivotal outer parts hinged on the stationary part are selectively swingable individually between open and closed positions. The outer parts define an extrusion orifice for the die in their closed position. When the outer parts are opened, maintenance can be performed on the die.

U.S. Pat. No. 4,413,973, issued to Peters, discloses a die which has a removable extrusion plate covering the die head. The plate can be removed and replaced to minimize down time required for maintenance.

A common feature of the prior art devices is that routine cleaning and maintenance requires at least some down time. While efforts have been made to simplify maintenance and reduce down time, no device has allowed maintenance to be performed while the extrusion operation is ongoing.

SUMMARY OF THE INVENTION

The present invention is directed to an extrusion die system which permits external cleaning and maintenance to be performed without interrupting the extrusion operation. A die is provided with an opening section for the extrusion of polymer. A removable insert is provided on the exterior surface of the die lip where build-up occurs, on one or both sides of the die opening section. The inserts are located close enough to the die opening section to encompass all or substantially all of the region where the exterior build-up occurs. However, the inserts do not extend to the die opening section or over the die opening section. Instead, there is a space between the die lip or opening section and the insert or inserts.

Because the one or more removable inserts do not interfere with the die opening section, the extrusion line can continue operating while the insert is being removed and replaced. Because much of the routine external maintenance of dies is directed to removing burnt polymer from the regions surrounding the die lip, the elimination of down time during the maintenance step substantially reduces the total down time needed to maintain the die. For best results, the insert or inserts should have one end positioned as close as possible to the die lip or opening, without interfering with the opening.

The one or more removable inserts can be designed into any type of polymer extrusion die including, without limitation, film extrusion dies, strand extrusion dies, melt spinning and melt blowing dies used to make nonwoven webs, and dies used to make tubes or parisons. The die openings may be straight, as in a cast film die, or curved, as in a blown film die. The die may also include a plurality of smaller openings arranged in a line, circle or pattern, such as in a melt spinning or melt blowing die. Regardless of the die type, the removable insert or inserts should be positioned as close as possible to the die opening or openings, without interfering with them. In other words, the portion or portions of the die defining the openings do not form part of the removable insert. The inserts should also extend far enough away from the die openings to cover the areas where burnt polymer accumulates.

With the foregoing in mind, it is a feature and advantage of the invention to provide an extrusion die having one or more removable inserts which can be removed and replaced during operation of the die.

It is also a feature and advantage of the invention to provide a method of cleaning the exterior of an extrusion die without stopping the flow of polymer through the die.

The foregoing and other features and advantages will become further apparent from the following detailed description of the presently preferred embodiments, read in conjunction with the accompanying drawings. The detailed description and drawings are intended to be illustrative rather than limiting, the scope of the invention being defined by the appended claims and equivalents thereof.

DEFINITIONS

As used herein, "cast film extrusion" refers to the extrusion of one or more polymer layers into a flat rectangular film using a die having a straight rectangular opening.

The term "blown film coextrusion" refers to the extrusion of one or more polymer layers into a film having a continuous cylindrical cross-section, using a die having a cylindrical opening.

The extrusion of "spunbonded fibers" means the production of small diameter fibers by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Levy and U.S. Pat. No. 3,542,615 to Dobo et al. Spunbond fibers are quenched and generally not tacky when they are deposited onto a collecting surface. Spunbond fibers are generally continuous and have average diameters larger than 7 microns, more particularly, between about 10 and 20 microns.

The extrusion of "meltblown fibers" means the production of small diameter fibers by extruding a molten thermoplastic material through a plurality of fine, usually circular, die capillaries as molten threads or filaments into converging high velocity gas (e.g., air) streams which attenuate the filaments of molten thermoplastic material to reduce their diameter, which may be to microfiber diameter.

Thereafter, the meltblown fibers are carried by the high velocity gas stream and are deposited on a collecting surface to form a web of randomly laid meltblown fibers.

Such a process is disclosed, for example, in U.S. Pat. No. 3,849,241 to Butin. Meltblown fibers are microfibers which may be continuous or discontinuous, are generally smaller than 10 microns in average diameter, and are generally tacky when deposited onto a collecting surface.

The term "polymer" generally includes but is not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to isotactic, syndiotactic, atactic and random symmetries.

The term "die opening section" refers to that portion of an extrusion die through which polymer flows. In a film extrusion die, the die opening section is generally a single opening bounded on both sides by die lips. In a filament die used to make spunbond or meltblown filaments, the die opening section is the entire portion of the die which contains small filament openings in rows or another pattern, and is bounded on both sides by the outermost rows of filament openings.

DETAILED DESCRIPTION OF THE PRESENTLY PREFERRED EMBODIMENTS

Figure 1:
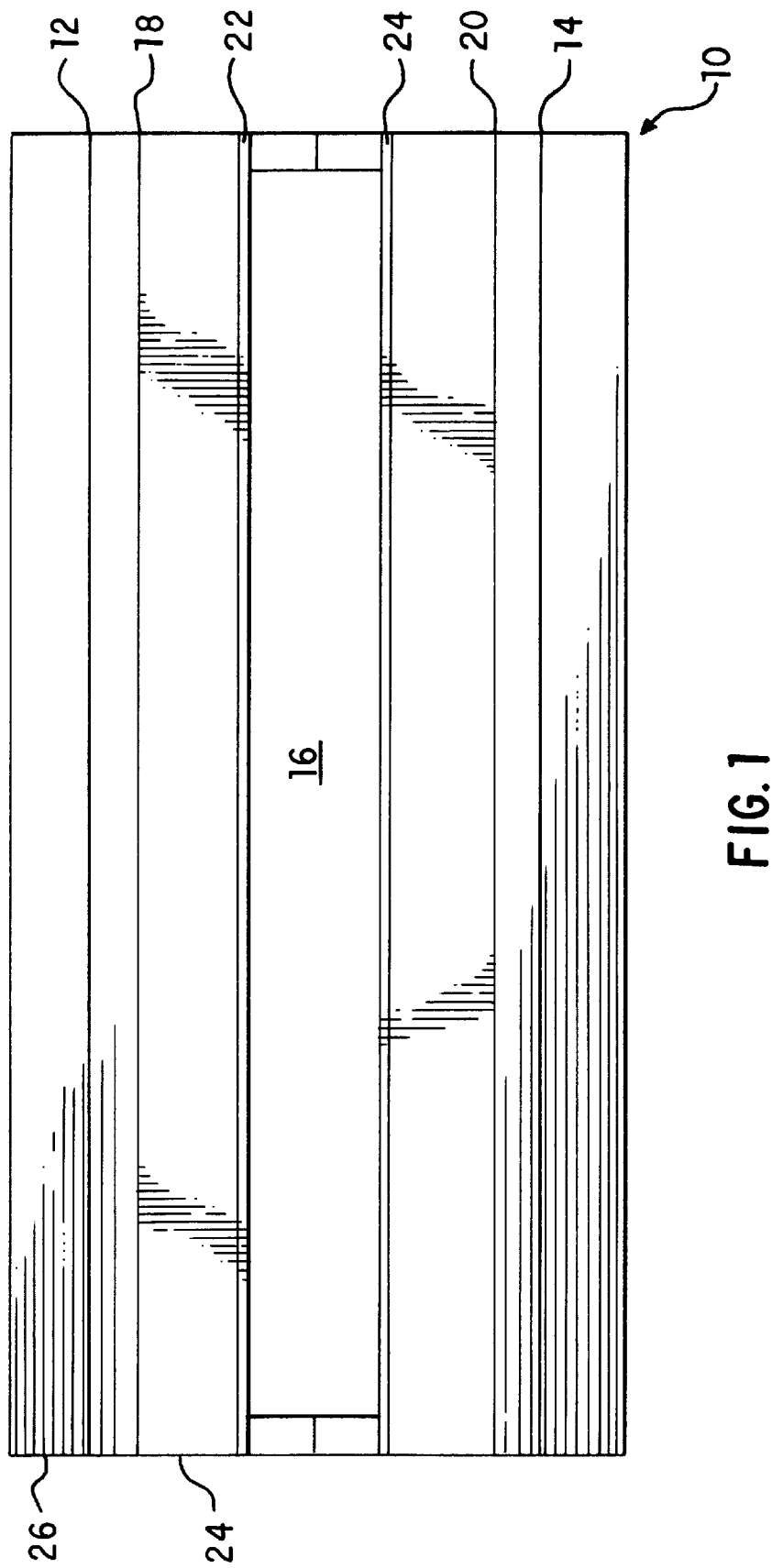
FIG. 1 is a front view of an extrusion die system of the invention.
Figure 2:
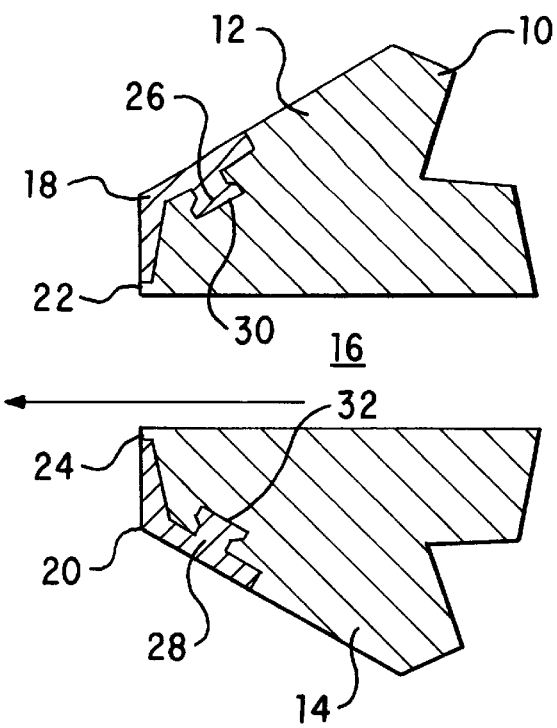
FIG. 2 is a side sectional view of a first embodiment of an extrusion die system of the invention.

Referring to FIGS. 1 and 2, a polymer extrusion die system 10 includes a first die section 12, a second die section 14, and a die opening section 16 located between the first and second die sections. If the die section 10 is for cast film extrusion or coextrusion, the die opening section 16 may be in the form of an elongated die slot. If the die system 10 is for melt blowing or spinning of filaments for nonwoven webs, the die opening section 16 may include a large number of smaller (e.g., circular) openings (not shown) arranged in rows or another pattern. If the die system 10 is used for extruding strands which are then cut into pellets, the die opening section 16 may include a single row of smaller (e.g., circular) openings. If the die system 10 is used to make a blown film or tube, the opening section 16 may be in the form of a circular slot. Other configurations for the die opening section 16 are possible, depending on the polymer extrusion application.

A first removable insert 18 is positioned as close as possible to the die opening section 16 without interfering with the die opening section 16. In other words, there must be a spacing portion 22 (i.e., a die lip) between the die opening section 16 and the nearest boundary of the removable insert 18. This spacing 22 should have a width on the order of about 0.001 inch to about 0.10 inch, suitably about 0.003 inch to about 0.05 inch, desirably about 0.005 inch to about 0.02 inch.

If the spacing 22 is too narrow, it becomes difficult and expensive to fabricate the lip portions ofthe die. If the spacing 22 is too large, then the effectiveness of the insert 18 is lessened because more burnt polymer may accumulate on the spacing 22, which is not removable during extrusion along with the insert. The spacing 22 should be narrow enough so as not to accumulate significant burnt polymer, yet not so narrow as to render its fabrication difficult.

The removable insert 18 should be wide enough to substantially cover the area affected by the accumulation and burning of polymer during extrusion. In the embodiment shown in FIGS. 1 and 2, for instance, the removable insert 18 extends beyond the die face 34, and onto the die shoulder 36. The insert 18 may have an overall width of about 0.25 to about 1.0 inch, for example. However, the preferred width of the insert 18 is a function of the overall die size, and the size of the area affected by accumulated and burning polymer. The length of the removable insert 18 should be at least as great as the length of the die opening section 16. The insert 18 may be constructed from steel or any suitable heat resistant material. The insert may be in one piece, or may be constructed from two or more sections which are interlocked or fastened together, or which merely abut one another.

When the die opening section 16 is rectangular, as in a cast film die or melt spinning die (having a plurality of smaller die openings arranged in a rectangular pattern), there will preferably be at least two of the inserts (18 and 20) positioned on opposite sides of the die opening section 16. Referring to FIGS. 1 and 2, the second insert 20, like the first one, is spaced from the die opening section 16 by a second spacer 24 (i.e., a second die lip). The inserts 18 and 20 can be identical, mirror images of each other, and have the same preferred dimensions and construction. When the die opening section 16 is rectangular, regions which accumulate burning polymer are likely to exist on both sides of the opening section. Thus, the use of inserts 18 and 20 on both sides is appropriate.

When the die opening section 16 is circular or otherwise continuous, as in a blown film line, it is impractical to place inserts both inside and outside of the blown film bubble. In this instance, most of the burning polymer accumulates on the outside due to the outward expansion of the bubble. Two of the removable die inserts having a curved (e.g., half-circular) configuration can be placed near the circular die opening on the outside, in order to facilitate maintenance of the blown film die during operation.

The removable inserts may be held in place using various techniques. Referring to FIGS. 1 and 2, the inserts 18 and 20 may be secured into the corresponding first and second die sections 12 and 14 using tab members 26 and 28, which engage corresponding slot members 30 and 32 in the die sections. The use of tab members 26 and 28, and corresponding slot members 30 and 32, allows the inserts 18 and 20 to be easily removed and replaced by simply sliding them to the left or right from the die 10. As an insert (18 or 20) is being removed from the left, for instance, a replacement insert can be inserted in the slot from the right, so that the slot is never empty during the changing of inserts. In the embodiment shown in FIG. 2, each of the tabs 26 and 28 (and corresponding slots 30 and 32) has a narrow stem and relatively wider head which allows the inserts 18 and 20 to be moved only laterally along the length of the die 10, but prevents movement perpendicular to the length of the die 10.

Figure 3:
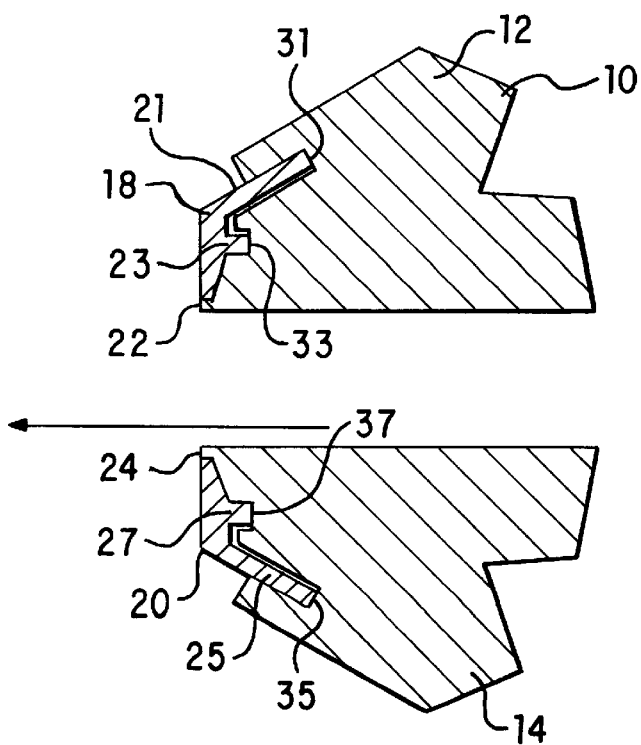
FIG. 3 is a side sectional view of a second embodiment of an extrusion die system of the invention.

FIG. 3 shows an alternative embodiment of the die 10 including removable inserts 18 and 20. In the embodiment of FIG. 3, each die insert 18 and 20 has two rectangular tab members oriented at different angles, engaging corresponding slots in the die sections 12 and 14. Die insert 18 is held into place with rectangular tab members 21 and 23 oriented at approximately a 45° angle from each other. The tab members 21 and 23 engage rectangular slot members 31 and 33 in the first die section 12. Similarly, die insert 20 is held into place with rectangular tab members 25 and 27 oriented at approximately a 45° angle from each other. Tab members 25 and 27 engage rectangular slot members 35 and 37 in the second die section 14. The tab members in this embodiment do not have wider and narrower portions. In this embodiment, the angle between adjacent tab members prevents movement of the die inserts 18 and 20 perpendicular to the length of the die 10, and permits only a sliding movement along the length of die 10.

Other techniques can also be employed for securing the removable die inserts 18 and 20 in place in the first and second die sections 12 and 14. For instance, the inserts 18 and 20 may be bolted in place. The use of tabs as described above is preferred, because the tabs permit simultaneous insertion of a new die insert while an existing one is being removed, so that the space in the die 10 occupied by inserts 18 and 20 is never empty.

During operation, molten polymer may flow through the die opening portions 16 in the direction of the arrows shown in FIGS. 2 and 3. Gradually, polymer accumulates and burns near the die lips on both sides of opening portion 16, with most of the accumulation occurring in regions occupied by the removable inserts 18 and 20. When the accumulation of burnt polymer becomes sufficient to contaminate the extruded product, or before that time, the die inserts 18 and 20 are simply removed and replaced without disrupting the production line. Through the use of elongated tabs in the inserts and corresponding slots as explained above, the inserts 18 and 20 can be removed and simultaneously replaced with new ones. This replacement can occur as many times, and as frequently as necessary, without stopping the flow of polymer through the die 10.

While the embodiments of the invention disclosed herein are presently considered preferred, various modifications and improvements can be made without departing from the spirit and scope of the invention. The scope of the invention is indicated by the appended claims, and all changes that fall within the meaning and range of equivalents are intended to be embraced therein.

I claim:

1. A die system for the extrusion of polymer, comprising:
   a die having an opening section for the extrusion of molten polymer;
   a removable insert located on a first side of the opening section, the removable insert being slidably connected to the die and including at least one tab engaging at least one slot in the die; and
   a spacing portion between the removable insert and the opening section;
   wherein the removable insert has an exposed surface which is longer than and contiguous with an exposed surface of the spacing portion.

2. The die system of claim 1, wherein the die comprises a first die section on said first side of the opening section and a second die section on a second side of the opening section.

3. The die system of claim 1, further comprising a second removable insert located on a second side of the die opening section, and a second spacing portion between the second removable insert and the die opening section.

4. The die system of claim 1, wherein the spacing portion has a width of about 0.001 inch to about 0.10 inch.

5. The die system of claim 1, wherein the spacing portion has a width of about 0.003 inch to about 0.05 inch.

6. The die system of claim 1, wherein the spacing portion has a width of about 0.005 inch to about 0.02 inch.

7. The die system of claim 1, wherein the removable insert is at least as long as the die opening section.

8. The die system of claim 1, wherein the removable insert includes a plurality of sections.

9. The die system of claim 1, wherein the tab comprises a relatively narrower stem and a relatively wider head.

10. The die system of claim 1, wherein the removable insert comprises at least two tabs oriented at an angle relative to each other, and engaging at least two slots in the die.

11. A die system for the extension of polymer, comprising:
    a die having an opening section for the extrusion of molten polymer;
    a first removable insert located on a first side of the opening section, the first removable insert being slidably connected to the die and including at least one tab engaging at least one slot in the die;
    a first spacing portion having a width not greater than about 0.10 inch, between the first removable insert and the die opening section;
    a second removable insert located on a second side of the opening section, the second removable insert being slidably connected to the die and including at least one tab engaging at least one slot in the die; and
    a second spacing portion having a width not greater than about 0.10 inch, between the second removable insert and the die opening section;
    wherein the first removable insert has an exposed surface which is longer than and contiguous with an exposed surface of the first spacing portion, and the second removable insert has an exposed surface which is longer than and contiguous with an exposed surface of the second spacing portion.

12. The die section of claim 11, wherein the opening section is rectangular.

13. The die system of claim 12, wherein the opening section comprises a single rectangular slot.

14. The die system of claim 12, wherein the opening section comprises a plurality of filament openings arranged in a pattern.

15. The die system of claim 11, wherein the opening section is curved.

16. The die system of claim 15, wherein the opening section is cylindrical.

17. The die system of claim 11, wherein the first and second spacings each have a width not greater than about 0.05 inch.

18. The die system of claim 11, wherein the first and second spacings each have a width not greater than about 0.02 inch.

19. The die system of claim 11, wherein at least one of the tabs comprises a relatively narrower stem and a relatively wider head.

20. The die system of claim 11, wherein at least one of the removable inserts comprises at least two tabs oriented at an angle relative to each other, and engaging at least two slots in the die.

* * * * *

UNITED STATES PATENT AND TRADEMARK OFFICE
CERTIFICATE OF CORRECTION

PATENT NO : 6,164,948
DATED : 26 December 2000
INVENTOR(S) : Michael Charles Cook It is certified that error appears in the above-identified patent and that said Letters Patent is hereby corrected as shown below:

In Column 6, line 13, please delete "extension" and after "the" insert --extrusion--.

Signed and Sealed this

First Day of May, 2001

Attest:

NICHOLAS P. GODICI

Attesting Officer     Acting Director of the United States Patent and Trademark Office